US007888630B2

(12) United States Patent
Wong

(10) Patent No.: US 7,888,630 B2
(45) Date of Patent: Feb. 15, 2011

(54) REDUCED SIZE HIGH FREQUENCY QUADRUPOLE ACCELERATOR FOR PRODUCING A NEUTRALIZED ION BEAM OF HIGH ENERGY

(76) Inventor: Alfred Y. Wong, 13704 Saticoy St., Panorama City, CA (US) 91402

(*) Notice: Subject to any disclaimer, the term of this patent is extended or adjusted under 35 U.S.C. 154(b) by 139 days.

(21) Appl. No.: 11/697,637

(22) Filed: Apr. 6, 2007

(65) Prior Publication Data

US 2007/0284522 A1 Dec. 13, 2007

Related U.S. Application Data

(60) Provisional application No. 60/744,380, filed on Apr. 6, 2006.

(51) Int. Cl.

| | |
|---|---|
| ***H01S 1/00*** | (2006.01) |
| ***H01S 3/00*** | (2006.01) |
| ***H05H 3/02*** | (2006.01) |
| ***H01J 49/00*** | (2006.01) |
| ***H05B 37/02*** | (2006.01) |

(52) U.S. Cl. ........................ 250/251; 250/292; 315/305

(58) Field of Classification Search ................. 250/251, 250/281, 282, 290, 292, 293; 315/500, 501, 315/505; 313/359.1, 360.1
See application file for complete search history.

(56) References Cited

U.S. PATENT DOCUMENTS 3,571,642 A * 3/1971 Westcott ................. 250/396 R
4,364,803 A * 12/1982 Nidola et al. ............... 205/161
4,568,509 A * 2/1986 Cvijanovich et al. ......... 376/109
4,700,069 A * 10/1987 Ino et al. ..................... 250/292
4,749,857 A * 6/1988 Druaux ....................... 250/251
4,801,847 A * 1/1989 Sakudo et al. ............. 315/5.41
5,084,682 A * 1/1992 Swenson et al. ............ 315/505
5,111,042 A * 5/1992 Sullivan et al. ............. 250/251
5,300,891 A * 4/1994 Tokoro .................. 250/492.21
5,430,359 A * 7/1995 Swenson et al. ............ 315/501
5,693,939 A * 12/1997 Purser ......................... 250/251
6,974,950 B2 * 12/2005 Leung et al. ................ 250/251
7,196,337 B2 * 3/2007 Mikolas .................. 250/423 R
7,504,619 B2 * 3/2009 Wolfe et al. ................. 250/251
2002/0180365 A1 * 12/2002 Okamura et al. ....... 315/111.81
2003/0042411 A1 * 3/2003 Leung et al. ................ 250/251
2003/0155502 A1 * 8/2003 Grosshans et al. .......... 250/282
2004/0108823 A1 * 6/2004 Amaldi et al. .............. 315/500
2006/0169891 A1 * 8/2006 Collings et al. ............. 250/291

* cited by examiner

*Primary Examiner*—Robert Kim
*Assistant Examiner*—Brooke Purinton
(74) *Attorney, Agent, or Firm*—Novak Druce DeLuca + Quigg LLP

(57) ABSTRACT

A reduced size high frequency quadrupole is provided having four elongated electrodes with oscillating power supplied to produce an electromagnetic field. An ion source is provided to supply the quadrupole with a negative ion beam and a positive ion beam. The quadruople has a buncher section, an acceleration section, and a neutralizer section where the ions can be bunched, accelerated and then mixed to produce a neutral ion beam of high energy.

27 Claims, 8 Drawing Sheets

REDUCED SIZE HIGH FREQUENCY QUADRUPOLE ACCELERATOR FOR PRODUCING A NEUTRALIZED ION BEAM OF HIGH ENERGY

BACKGROUND OF THE INVENTION

1. Field of the Invention

The present invention generally relates to a reduced size high frequency quadrupole for accelerating ions in a neutralized ion beam.

2. Description of the Background Art

Radio frequency quadrupoles (RFQs) have been used for the confinement and acceleration of ion particles for many years. RFQs generally consist of four elongated electrode rods surrounding a central axis through which an ion beam passes. The electrodes are driven by an oscillating voltage to produce an electromagnetic field. Such radio frequencies produced can be any periodic, time varying waves such as, UHF or microwaves. When the frequencies are applied, rods opposite one another assume opposite charges thereby establishing an electric field having a certain direction between the electrode rods.

Transverse confinement of positive and negative ions occurs when the RFQ structures are in a cylindrical geometry. When the periodic, time varying voltage is applied between the pairs of quadrupole rods, particles having charge-to-mass ratios in a certain range (dictated by the quadrupole dimensions, driving voltage, and driving frequency) are confined transversely while remaining free to move longitudinally. This principle is employed in quadrupole mass spectrometry. The confinement occurs regardless of the sign of the particle charge.

Acceleration of the particles in the longitudinal direction is produced by perturbing the shape of the surface of the quadrupole rods facing the central axis. When using a microwave frequency quadrupole (MFQ), a sinusoidal scallop is added along the axis of the vanes or electrodes. While maintaining the radial trapping, this structure imposes a longitudinal traveling wave that moves down the axis at a speed governed by the driving frequency and scallop wavelength. Particles are trapped in bunches by the wave, and are accelerated as the scallop wavelength increases. So far, MFQs have been used only to accelerate single species of particles.

When positive and negative ions of the same charge-to-mass ratio are combined in a beam in equal proportions, the beam has overall charge neutrality, and is called a "neutralized ion beam." Neutralized ion beams will avoid charging the target; a charged target can cause repulsion of the incident ion beam, thereby requiring higher and higher energies of the incident beam for penetration. Unlike in an ion-electron neutralized beam, the positive and negative species of a neutralized ion beam respond symmetrically to electric and magnetic forces. This property lends itself to a range of applications, including fusion energy research, plasma processing, and ion propulsion, as well as to the acceleration of the beam itself. Currently, fusion devices employ neutral beam injectors that are very large in size and/or cannot efficiently produce MeV beams. What is needed is a reduced size compact and efficient RFQ which provides a neutralized ion beam of high energy.

SUMMARY OF THE INVENTION

One embodiment of the invention is a high frequency quadrupole apparatus with an even number of elongated electrodes, preferably four, arranged around a central axis to form a quadrupole. An ion source injects a positive ion beam and a negative ion beam into the quadrupole. A power source drives the electrodes with a time-varying periodic voltage to induce an electromagnetic field. In the preferred embodiments, the field will be a microwave field. The quadrupole will be divided into several sections, with a buncher section located at the beginning of the quadrupole, an acceleration section posterior to the buncher section and furthermore, a neutralizer section posterior to the acceleration section. For acceleration of the bunched particles, the buncher section and acceleration section have a scallop with a specified wavelength, and will preferably be sinusoidal. Furthermore, the quadrupole will be miniaturized to the dimension of submillimeters allowing for a high (e.g., radio) frequency wave. By such an apparatus and method according to the current invention, a reduced size RFQ can bunch and accelerate ions of different signs to achieve a neutralized ion beam of high energy. As shown in FIG. 1, the neutralized ion beam comprises positive ions ("+") and negative ions ("−") propagating through the neutralizer section under radial constraint of the electric field generated in the neutralizer section of the electrodes.

DETAILED DESCRIPTION OF THE PREFERRED EMBODIMENTS

Figure 1:
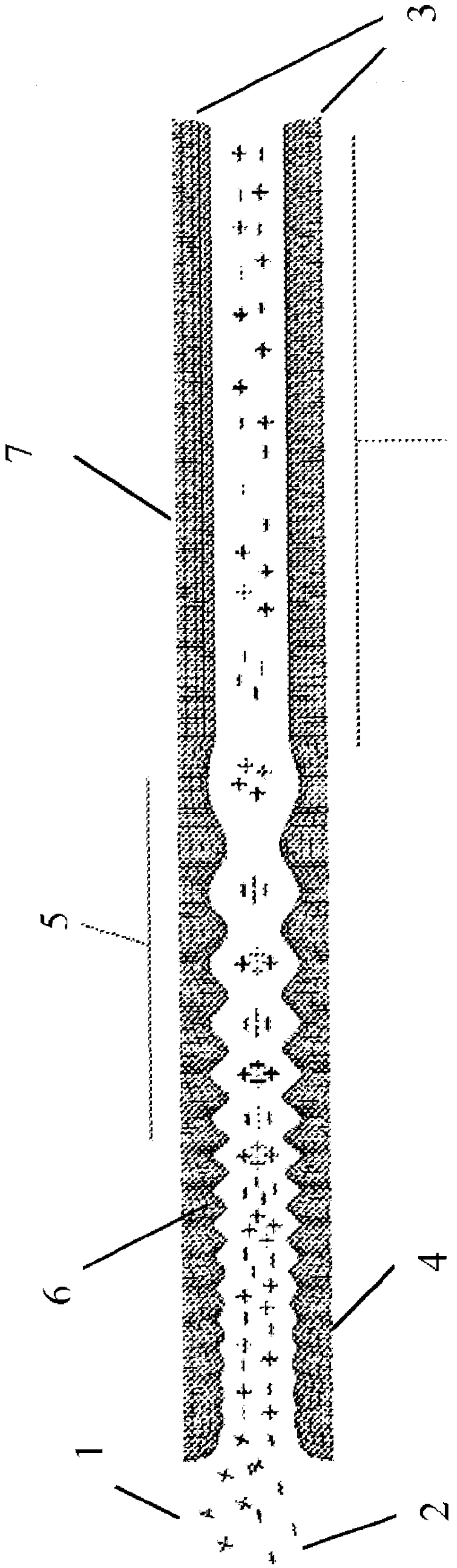
FIG. 1 is a conceptualized illustration of the production of an energetic neutralized ion beam in accordance with the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

MFQs utilize wave-particle interaction to accelerate particles, and can simultaneously accelerate positive ion bunches (in wave troughs) and negative ion bunches (in wave crests). After acceleration, the longitudinal field in the MFQ can be relaxed (while maintaining transverse confinement), allowing the ion bunches to mix and form a neutralized ion beam. The driving field (E) is made to travel in phase for a sustained duration with ions that are being accelerated.

This can be accomplished by use of a specific design structure driven by a time varying field regulated by control software programming. This method of acceleration can be compared to a surfer riding on an ocean wave. The surfer, or particle, can gain velocity for a long duration when the wave moves slightly ahead of the surfer. This wave-particle coupling technique obviates the need for a high voltage as used in a conventional ion source.

The apparatus and method according to the invention produces high current density, low emittance beams, with energies ranging from very low (less than 1 ev) to the MeV range, by using a range of frequencies from KHz to multi-GHz. In a preferred embodiment, microwaves are used, however, in principle all frequencies can be used.

Theoretical studies of MFQs have shown that scaling favors a reduction in size, as shown by the stability criterion, Q=2, where Q, the quality factor, $=4\ qV_{ocs}/M\omega^2\ r_o^2$, where $V_{ocs}$ is the voltage, q is the charge of the ion, M is the ion mass, ω is the imposed frequency, and $r_o$ is the aperture size. As the aperture size decreases, if everything else is kept constant, the imposed frequency must increase to satisfy the above criterion. A high frequency drive requires a smaller resonant cavity which is consistent with miniaturized or reduced size RFQ.

In the laboratory an RFQ has been used to accelerate ions of both signs axially, while confining them radially by the same high frequency field at UHF frequencies. Each tiny module is sized in dimensions of submillimeters. As a result of the small dimension the oscillating electric field is high for even modest imposed voltages. MFQs can accelerate ions over a relatively small distance to many times the initial velocity of ion and neutrals. High frequency is being used for this purpose. The oscillating field, E, can be very high even for modest voltages if the dimension is the scale of microns. The current can be increased by multiplying the number of modules. This phenomenon is demonstrated by looking at the equation $v^2=v_o^2+2aS$, where v is the final velocity, $v_o$ is the initial velocity, a is the acceleration, and S is the length of the accelerator. The acceleration "a" is also equal to qE/m where $E=V/r_o$. Because the initial velocity $v_o$ is small, $v^2\cong 2qVS/mr_o$ or $mv^2/2=qVS/r_o$. With all other factors held constant, the smaller $r_o$ is, the greater is the final velocity of the ion. This leads to the reduced miniaturized size of the RFQ of the current invention.

One embodiment of an MFQ according to the invention is displayed in FIG. 1. As shown, entering the MFQ is a positive ion beam 1 and a negative ion beam 2. In some embodiments the ion source has a sharp electrode made of palladium and loaded with hydrogen or deuterium which when biased positively or negatively produces, respectively, positive or negative ions of a determined energy. Two pairs of electrode rods 3 make up the MFQ, where rods opposite one another have opposite charges. The ions then enter the buncher section 4 of the MFQ and pass from there to the accelerator portion 5. The sinusoidal scallop 6 can be seen on the surface of the rods in the accelerator section 5. Through these sections the beam evolves from its initial uniform longitudinal distribution into alternate bunches of positive and negative ions as shown in section 5 and the acceleration of the bunches to the desired final energy. After acceleration, the ions enter a neutralization section 7 where the MFQ rods are no longer scalloped. In some embodiments, each section is driven at a harmonic of the base frequency such that phase matching can be preserved as ion bunches pass from one section to another.

Figure 2C:
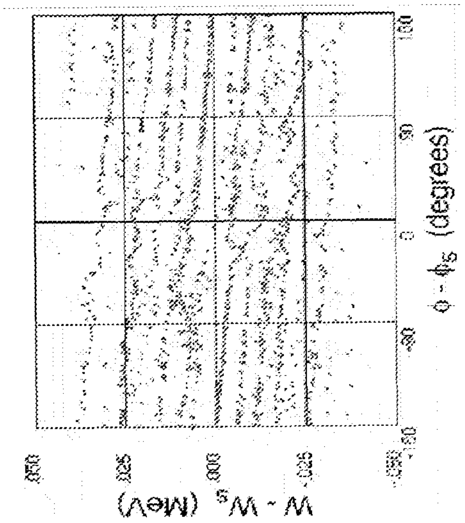
FIG. 2*c* is a graphic representation of beam particle distribution at the neutralizer section.
Figure 2B:
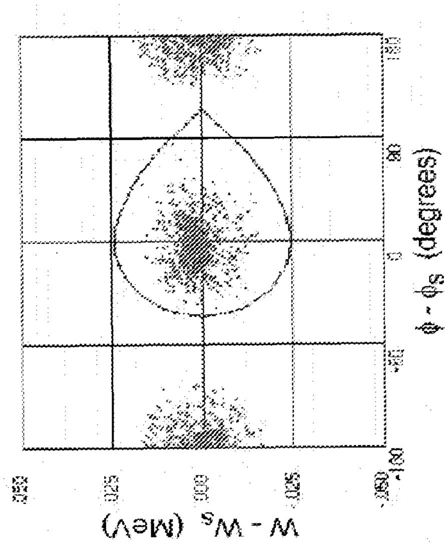
FIG. 2*b* is a graphic representation of beam particle distribution at the middle of the accelerator section of the MFQ.
Figure 2A:
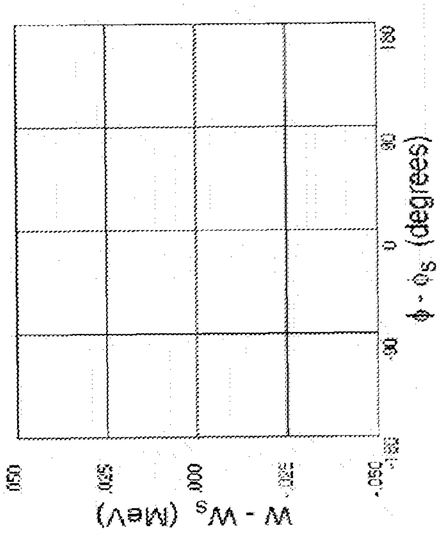
FIG. 2*a* is a graphic representation of beam particle distribution at the beginning of the buncher section of the MFQ.

FIGS. 2*a* and 2*b* are beam particle distribution graphs corresponding to, respectively, the beginning of the buncher section 4 and the middle of the accelerator section 5 of the MFQ as shown in FIG. 1. The absence of the scallop in the neutralization section 7 relaxes the longitudinal field and allows the accelerated $D^+$ and $D^-$ ion beams to mix, which is shown in the graph of FIG. 2*c*.

The MFQ can be miniaturized through special fabrication techniques using micro-machining followed by vapor deposition to provide a metallic coating to the cavity. It also utilizes the accurate alignment capability of nanotechnology fabrication, making it possible to achieve tolerances of 50 microns, 0.1 microns or better.

Simulation 1

As also demonstrated by FIGS. 2*a*-2*c*, a simulation of the MFQ process shows that positive and negative ions are injected into an MFQ and both species are trapped and accelerated. The simulation is conducted using PARMTEQ software. PARMTEQ produces a detailed MFQ design and calculates MFQ particle dynamics in three dimensions, including two dimensional space charge effects (exploiting azimuthal symmetry).

In the simulation, a DC beam of 10 mA $D^+$ and a DC beam of 10 mA $D^-$ are injected at 100 keV into a 500 MHz MFQ and are accelerated to 1 MeV (currents are given as absolute magnitudes). The beams enter an MFQ as in FIG. 1, which allows the acceleration and mixing of $D^+$ and $D^-$, which is shown in FIG. 2*c*. The result is a 1 MeV neutralized ion beam. In the simulation, 95% of the 20 mA $D^+/D^-$ beam was successfully transported through the MFQ, compared to 90% of a beam composed of 10 mA $D^+$ alone. This indicates that greater total beam throughput in an MFQ may be attained by injecting both positive and negative ions. The MFQ simulated here was not optimized for length; the accelerator and neutralization sections were 2.5 m and 5 m long, respectively, but in other embodiments, substantially shorter lengths are possible.

Simulation 2

Figure 3:
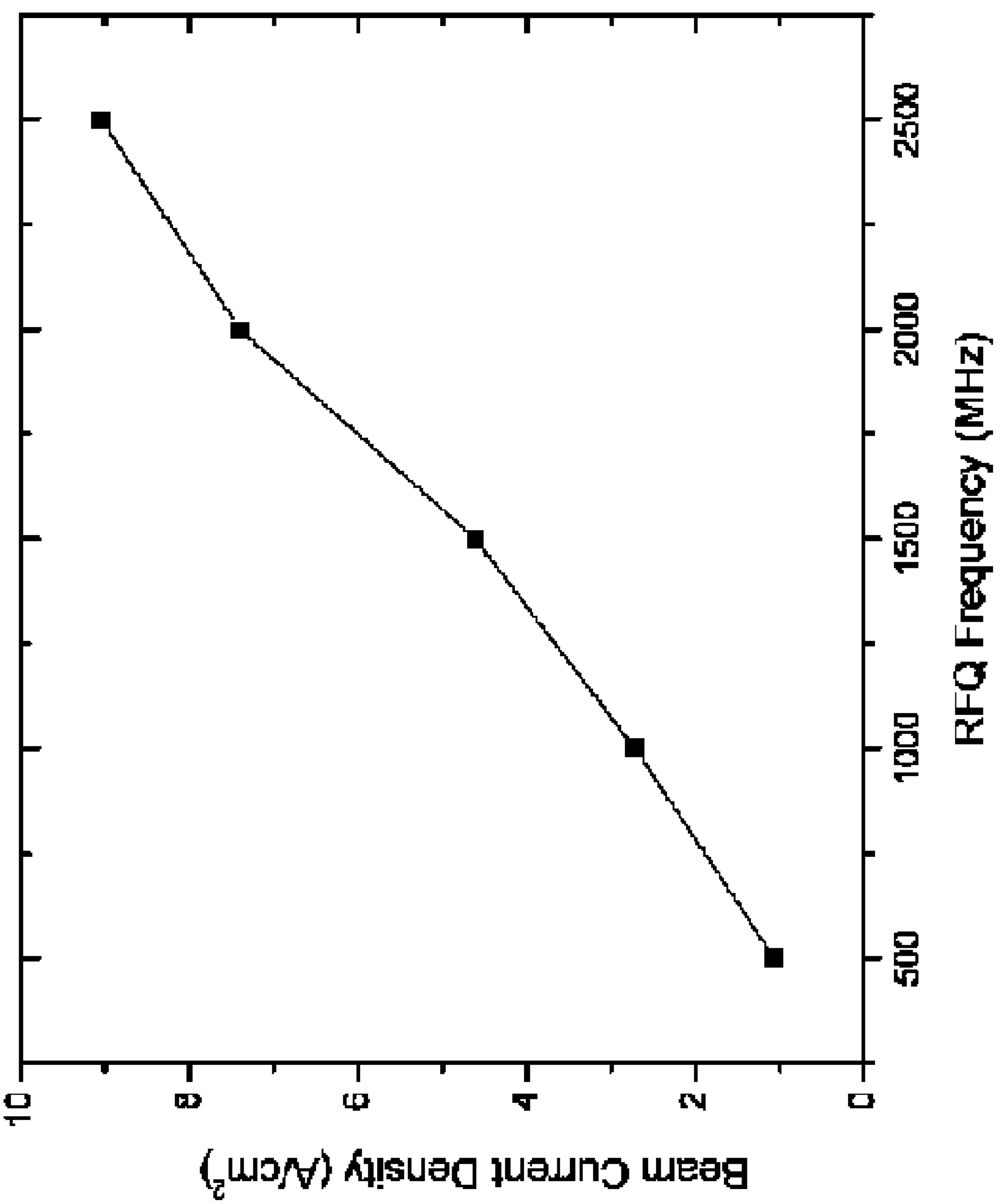
FIG. 3 is a graph of PARMTEQ current density results for a series of 1 MeV MFQs of varying frequency.
Figure 4:
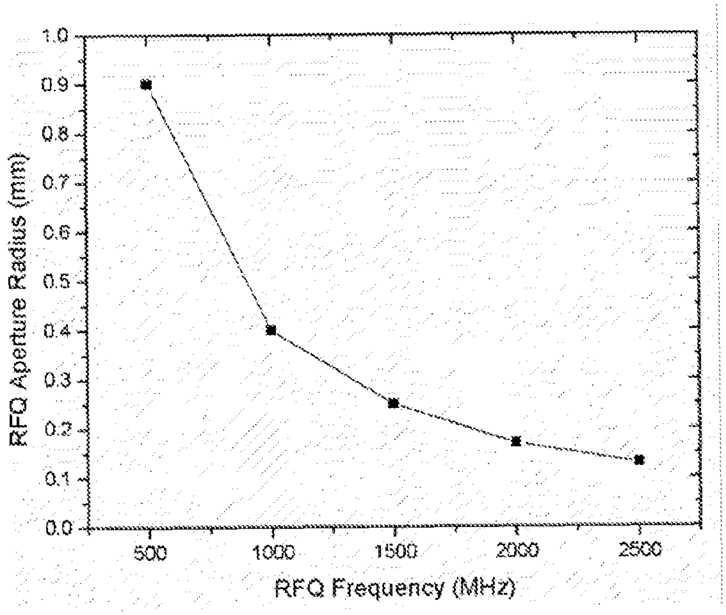
FIG. 4 is a graph of aperture sizes for the MFQ's of FIG. 3.

Space-charge forces oppose the transverse confinement and longitudinal bunching of the particles in the MFQ. This imposes "transverse" and "longitudinal" current density limits on the MFQ beam. For a given frequency, the MFQ aperture size and applied voltage can be optimized such that the beam current density is maximized. The current density limit theory indicates that, as the frequency is increased, the maximum current density increases, and the optimal aperture size and voltage decrease. These predictions are confirmed by PARMTEQ runs. FIG. 3 shows the increase in beam current density with MFQ frequency, and furthermore, FIG. 4 shows the corresponding decrease in aperture size as frequency increases. This property indicates that a compact MFQ can yield a high current density beam with a small cross section.

EXAMPLE

Figure 5:
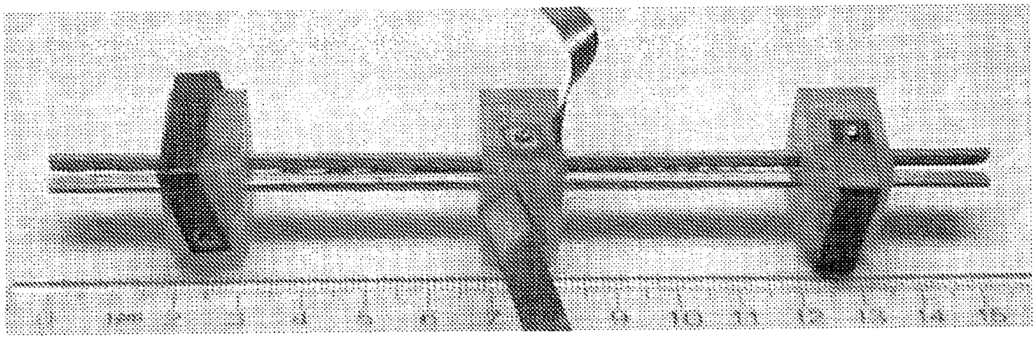
FIG. 5 shows a prototype MFQ accelerator constructed in accordance with the invention.

Theory and simulation show that a compact MFQ driven at high frequency can accelerate a high current density beam. In this example a small MFQ of aperture radius 0.75 mm and length 15 cm, is used and displayed in FIG. 5. It is initially being driven at 120 MHz with RF voltage 1 kV, requiring only 14 W of power.

Figure 6:
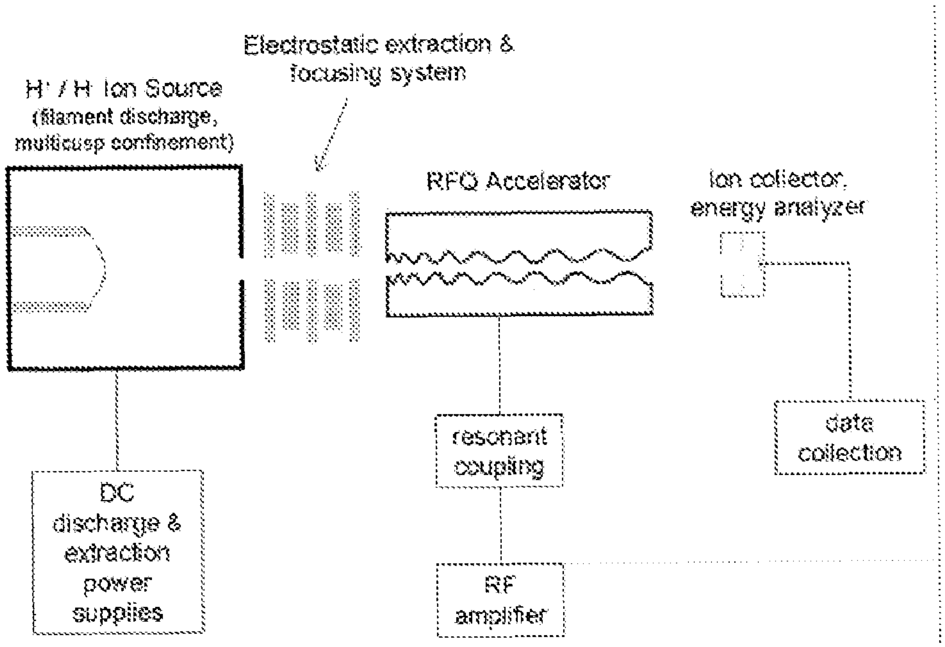
FIG. 6 is a block diagram of ion acceleration system with use of an RFQ.
Figure 7:
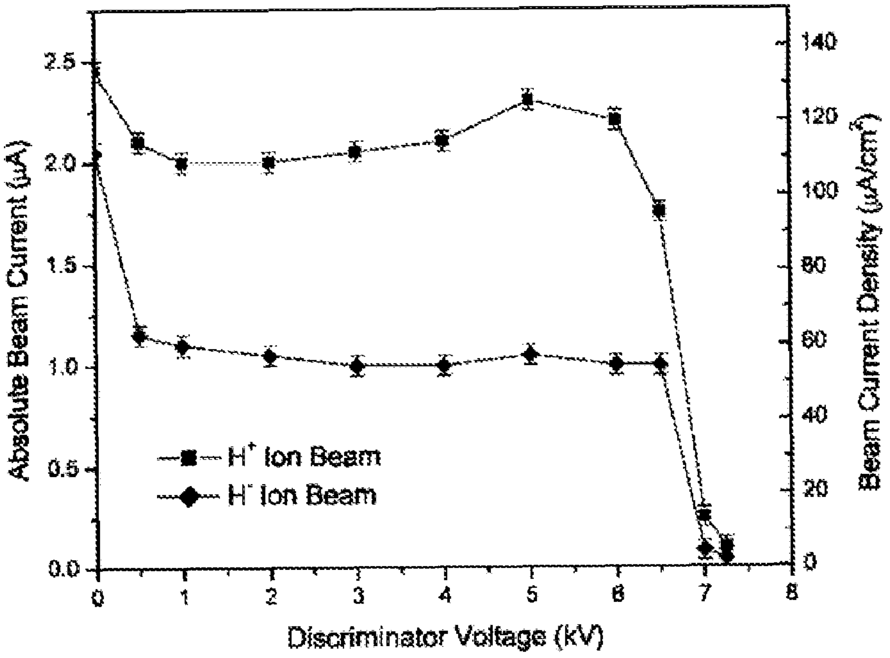
FIG. 7 is a graph of ion acceleration results.
Figure 8:
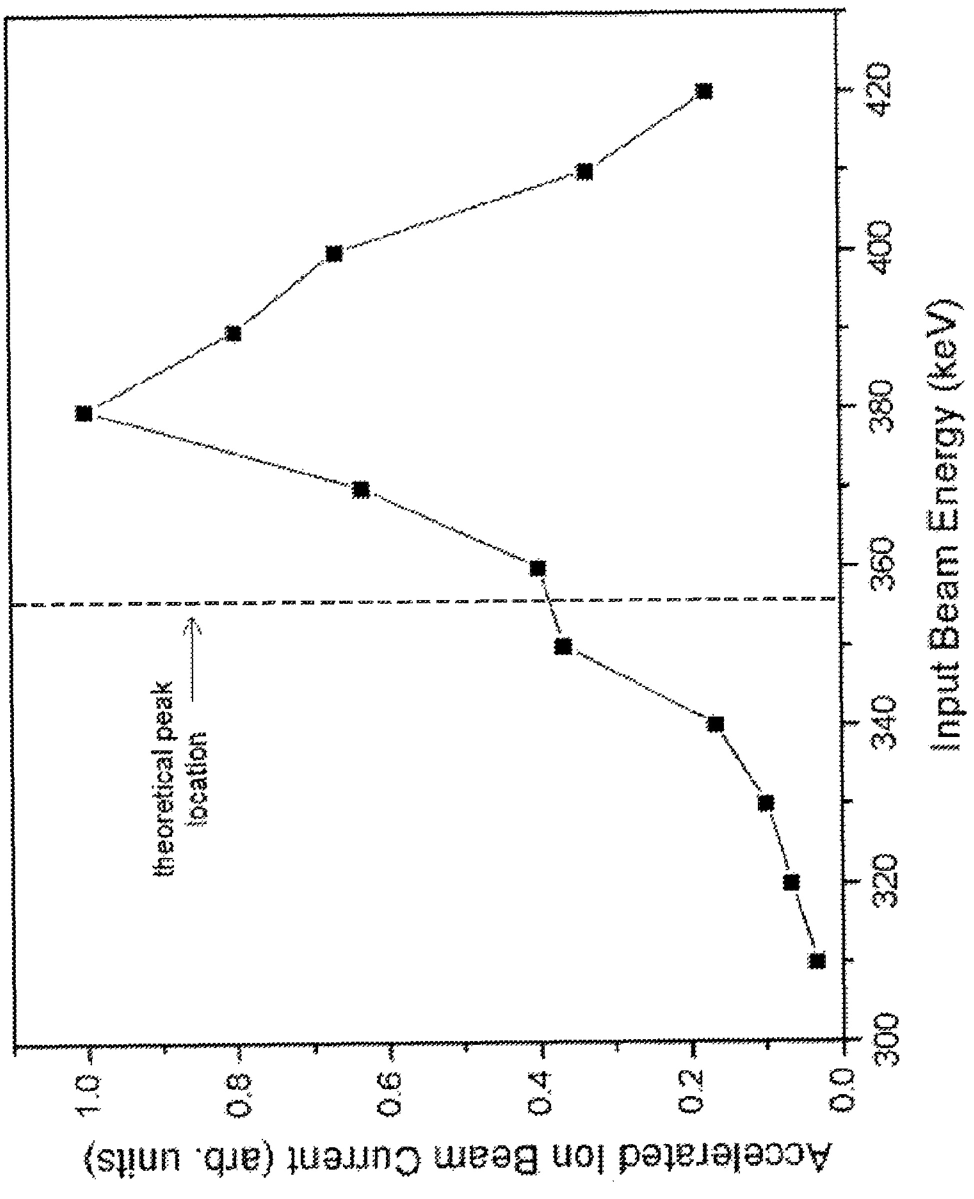
FIG. 8 shows the theoretical optimal value for injection energy.
Figure 9:
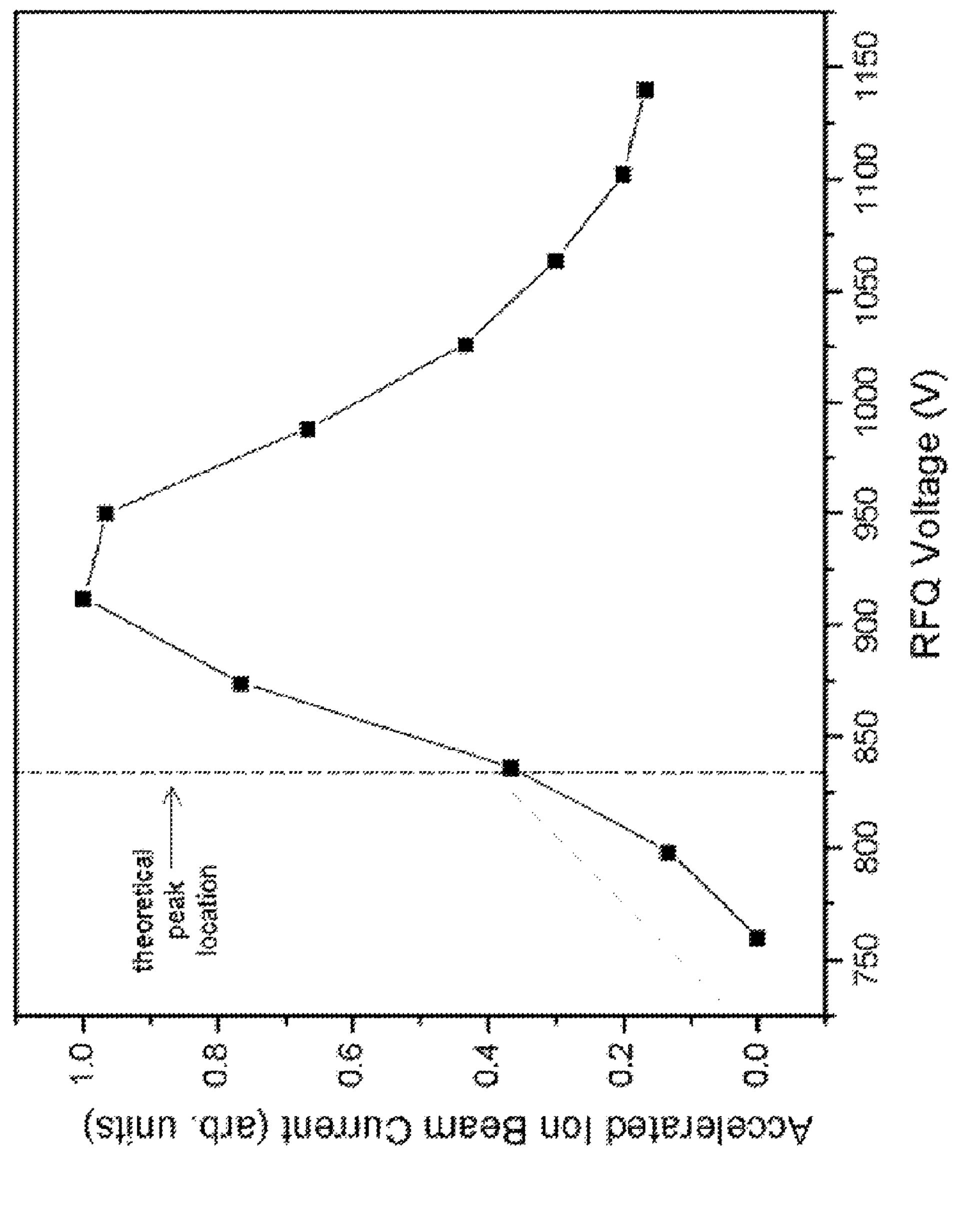
FIG. 9 shows the theoretical optimal value of RF voltage.

With these parameters, the MFQ accelerates H+ or H− ions from 350 eV to 7 keV. A block diagram of the system is shown in FIG. 6. The ion source in that diagram is of the magnetic multicusp, volume production type, is water cooled, and utilizes magnetic filters near the extraction aperture to increase the desired ion species yield. Initial ion acceleration results using this set up are shown in FIG. 7. H+ and H− beams are both successfully accelerated to 7 keV, with the H+ current being higher due to the ion source's greater yield of H+ compared to H−. The example also exhibits the proper dependencies on injection energy as shown in FIG. 8 and RF voltage shown in FIG. 9.

The simulation results presented here confirm the expected ability of an MFQ to accelerate positive and negative ions simultaneously. The transverse confinement maintained by the MFQ after acceleration allows the beam species to debunch and mix, yielding an energetic neutralized ion beam.

Figure 10:
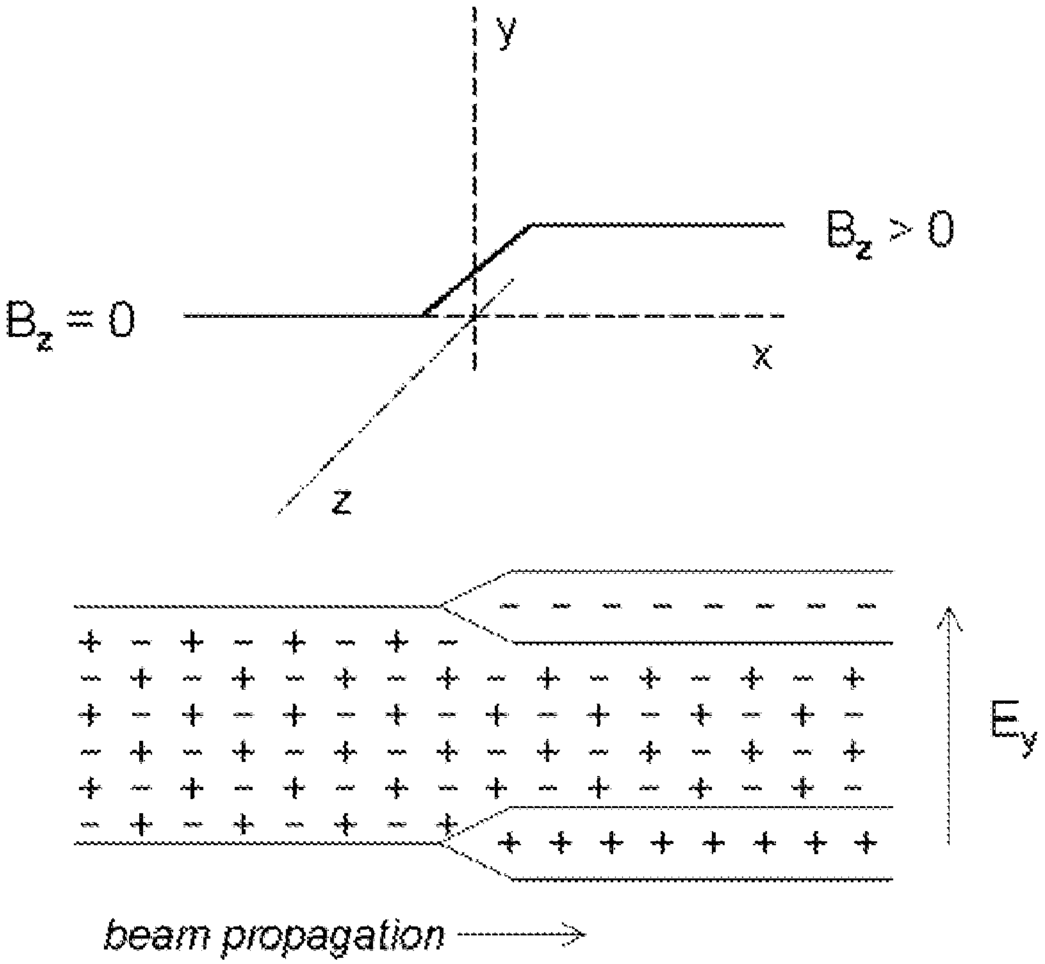
FIG. 10 depicts a neutralized beam propagating across a transverse magnetic field.

It has been demonstrated both in theory and experiment that a neutralized ion beam (H+, H−) may propagate across a transverse magnetic field if the beam is sufficiently energetic and dense (the effect is depicted in FIG. 10). These conditions may be expressed as a requirement on the plasma dielectric constant $$\varepsilon = 1 + \frac{\omega_i^2}{\Omega_i^2} >> \left(\frac{M}{m}\right)^{1/2}$$

where $\omega_i$ and $\Omega_i$ are the ion plasma and cyclotron frequencies, M is the ion mass, and m is the electron mass. For a neutralized ion beam of the type discussed here, the electron mass is replaced by the negative ion mass. The effect is to significantly lower the required beam density for propagation. It may therefore be advantageous to use neutralized ion beams in applications that require cross-field propagation, such as injection into fusion devices.

What is claimed is:

1. A high frequency quadrupole accelerator apparatus comprising:

an even number of elongated electrodes arranged around a central axis arranged to form a quadrupole;

an ion source for providing a positive ion beam and a negative ion beam into the quadrupole;

a power source that drives the electrodes with a time varying voltage to induce an electromagnetic field within said quadrupole;

wherein the quadrupole has a buncher section located at the beginning of the quadrupole, and an acceleration section located posterior to said buncher section, and a neutralization section located posterior to said acceleration section;

wherein the electrodes are scalloped in the buncher section and the acceleration section whereby positive and negative ions can be bunched and accelerated to a final energy; and wherein the neutralization section is without a scallop whereby ions can mix to produce a neutralized ion beam.

2. The high frequency quadrupole accelerator apparatus of claim 1 wherein said even number of elongated electrodes comprises four electrodes.

3. The high frequency quadrupole accelerator apparatus of claim 1 wherein the electromagnetic field is a microwave field.

4. The high frequency quadrupole accelerator apparatus of claim 1 wherein the scallop has a sinusoidal shape.

5. The high frequency quadrupole accelerator apparatus of claim 1 wherein the scallop wavelength increases along the length of the electrodes of the quadrupole.

6. The high frequency quadrupole accelerator apparatus of claim 1 wherein the quadrupole forms an aperture along the central axis.

7. The high frequency quadrupole accelerator apparatus of claim 6 wherein the aperture radius size is from about 0.1 mm to 0.9 mm.

8. The high frequency quadrupole accelerator apparatus of claim 6 wherein the aperture radius size is less than 1 mm.

9. The high frequency quadrupole accelerator apparatus of claim 6 wherein the aperture radius size is reduced to correspond to a high frequency drive.

10. The high frequency quadrupole accelerator apparatus of claim 1 wherein the electrodes are driven by a high frequency power source of 1 Ghz to multi-Ghz.

11. The high frequency quadrupole accelerator apparatus of claim 6 wherein the aperture size is reduced to correspond to high frequencies to maintain a Q stability factor.

12. The high frequency quadrupole accelerator apparatus of claim 1 wherein two pairs of electrodes are aligned to within a tolerance of 0.1 microns to 50 microns.

13. The high frequency quadrupole accelerator apparatus of claim 1 wherein the ion source has a sharp electrode made of palladium and loaded with hydrogen or deuterium which when biased positively or negatively produces, respectively, positive or negative ions of a determined energy.

14. The high frequency quadrupole accelerator apparatus of claim 1 wherein each section is driven at harmonics of the base frequency such that phase matching can be preserved as ion bunches pass from one section to another.

15. A method for accelerating ions in a high frequency quadrupole to produce a neutralized ion beam comprising:

applying an oscillating power source to drive four elongated electrodes arranged in pairs defining a central axis such that each electrode in a pair is opposite another whereby an electromagnetic field is produced about said central axis, and injecting said quadrupole with a positive ion beam and a negative ion beam from at least one ion source;

wherein said quadrupole has a buncher section located at the beginning of the quadrupole, and an acceleration section located posterior to said buncher section;

wherein the electrodes are scalloped in the buncher section and the acceleration section so that positive and negative ions can be bunched and accelerated to a final energy; and further comprising a neutralization section without a scallop whereby ions can mix in said neutralization section to produce a neutralized ion beam.

16. The method of claim 15 wherein the electromagnetic field is a microwave field.

17. The method of claim 15 wherein the scallop is sinusoidal in shape.

18. The method of claim 15 wherein the scallop wavelength increases along the length of the electrodes of the quadrupole.

19. The method of claim 15 wherein the quadrupole forms an aperture along the central axis.

20. The method of claim 19 wherein the aperture radius size is from about 0.1 mm to 0.9 mm.

21. The method of claim 19 wherein the aperture radius size is less than 1 mm.

22. The method of claim 19 wherein the aperture radius size is reduced to correspond to a high frequency drive.

23. The method of claim 15 wherein the electrodes are driven by a high frequency power source of 1 Ghz to multi-Ghz.

24. The method of claim 19 wherein the aperture size is reduced to correspond to high frequencies to maintain a Q stability factor.

25. The method of claim 15 wherein two pairs of electrodes are aligned to within a tolerance of 0.1 microns to 50 microns.

26. The method of claim 15 wherein the ion source has a sharp electrode made of palladium and loaded with hydrogen or deuterium which when biased positively or negatively produces, respectively, positive or negative ions of a determined energy.

27. The method of claim 15 wherein each section is driven at harmonics of the base frequency such that phase matching can be preserved as ion bunches pass from one section to another.

* * * * *